US012809077B2

(12) United States Patent
Yamada

(10) Patent No.: US 12,809,077 B2
(45) Date of Patent: Nov. 24, 2026

(54) VIRTUAL REALITY DISPLAY DEVICE

(71) Applicant: FUJIFILM Corporation, Tokyo (JP)

(72) Inventor: Naoyoshi Yamada, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

(21) Appl. No.: 18/754,503

(22) Filed: Jun. 26, 2024

(65) Prior Publication Data

US 2024/0345306 A1 Oct. 17, 2024

Related U.S. Application Data

(63) Continuation of application No. PCT/JP2022/048334, filed on Dec. 27, 2022.

(30) Foreign Application Priority Data

Dec. 27, 2021 (JP) ................................ 2021-212967
Dec. 22, 2022 (JP) ................................ 2022-205609

(51) Int. Cl.
*G02B 5/30* (2006.01)

(52) U.S. Cl.
CPC ......... *G02B 5/3083* (2013.01); *G02B 5/3016* (2013.01)

(58) Field of Classification Search
CPC ...... G02B 5/3083; G02B 5/3016; G02B 5/30; G02B 27/02
See application file for complete search history.

(56) References Cited

U.S. PATENT DOCUMENTS 10,283,735 B2 * 5/2019 Kim ........................ H10K 59/35
10,890,776 B1 1/2021 Gao et al.
11,860,393 B2 * 1/2024 Zhang .................. G02B 5/3025
2020/0326462 A1 10/2020 Yanai et al.
2021/0036264 A1 2/2021 Hu et al.
2021/0294012 A1 * 9/2021 Wong ................. G02B 27/0172
(Continued)

FOREIGN PATENT DOCUMENTS

JP 11-237584 A 8/1999
JP 2020-519964 A 7/2020
(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2022/048334, dated Jul. 11, 2024, with an English translation.

(Continued)

*Primary Examiner* — William R Alexander
*Assistant Examiner* — Ruby L Kauffman
(74) *Attorney, Agent, or Firm* — Birch, Stewart, Kolasch & Birch, LLP

(57) ABSTRACT

Provided is a thin virtual reality display device including a pancake lens where leaked light can be reduced. The virtual reality display device includes at least an image display panel, a first absorptive linear polarizer, a first retardation layer, a reflective circular polarizer, a half mirror, a second retardation layer, and a second absorptive linear polarizer in this order, in which the reflective circular polarizer has an action of a concave mirror with respect to a beam incident from the half mirror side.

15 Claims, 3 Drawing Sheets

(56) References Cited

U.S. PATENT DOCUMENTS

2022/0146803 A1 5/2022 Etter et al.
2023/0022744 A1* 1/2023 Sato .................. G02F 1/133504

FOREIGN PATENT DOCUMENTS

WO WO 2019/131950 A1 7/2019
WO WO-2021200428 A1 * 10/2021 ............... G02B 5/18

OTHER PUBLICATIONS

International Search Report (Form PCT/ISA/210) for International Application No. PCT/JP2022/048334, dated Mar. 7, 2023, with English translation.

* cited by examiner

VIRTUAL REALITY DISPLAY DEVICE

CROSS-REFERENCE TO RELATED APPLICATIONS

This application is a Continuation of PCT International Application No. PCT/JP2022/048334 filed on Dec. 27, 2022, which claims priority under 35 U.S.C. § 119 (a) to Japanese Patent Application No. 2021-212967 filed on Dec. 27, 2021 and Japanese Patent Application No. 2022-205609 filed on Dec. 22, 2022. The above applications are hereby expressly incorporated by reference, in their entirety, into the present application.

BACKGROUND OF THE INVENTION

1. Field of the Invention

The present invention relates to a virtual reality display device.

2. Description of the Related Art

The virtual reality display device is a display device where a user can obtain a realistic effect as if the user is in the virtual world by wearing a dedicated headset on the head and recognizing a video displayed through a lens.

In general, the virtual reality display device includes an image display panel and a Fresnel lens, and the distance from the image display panel to the Fresnel lens increases. Therefore, there is a problem in that the headset increases and the wearability is poor.

Accordingly, JP2020-519964A discloses a lens configuration called a pancake lens including an image display panel, a reflective polarizer, and a half mirror, in which the total thickness of the headset decreases by causing a beam emitted from the image display panel to reciprocate between the reflective polarizer and the half mirror.

SUMMARY OF THE INVENTION

In the pancake lens described in JP2020-519964A, there is a problem in that a part of the beam emitted from the image display panel is leaked light without reciprocating between the reflective polarizer and the half mirror due to disturbance of polarization, unpreferable reflection, and the like, which leads to occurrence of double images, a decrease in contrast, and the like.

JP2020-519964A discloses a configuration of the pancake lens where a reflective linear polarizer is used as the reflective polarizer and the image display panel, the reflective linear polarizer, and the half mirror are provided in this order.

However, in a case where the image display panel, the reflective polarizer, and the half mirror are provided in this order, the reflective polarizer needs to have an action of a concave mirror with respect to a beam incident from the half mirror side. Further, in order to impart the function of the concave mirror to the reflective linear polarizer, the reflective linear polarizer needs to be formed in a curved shape.

According to an investigation by the present inventors, it was found that, in a case where the reflective linear polarizer is formed in a curved shape, an optical axis of the reflective linear polarizer is distorted, appropriate reflection and transmission of incidence light cannot be performed, and the leaked light rather increases.

On the other hand, according to the investigation by the present inventors, it was found that, in a case where the image display panel, the reflective polarizer, and the half mirror are provided in this order, the leaked light of the pancake lens can be suppressed.

The present invention has been made in consideration of the above-described problems, and an object thereof is to provide a thin virtual reality display device including a pancake lens where leaked light can be reduced.

As a result of intensive studies repeatedly conducted by the present inventors on the above-described object, it has been found that the above-described object can be achieved by the following configurations.

[1] A virtual reality display device comprising at least an image display panel, a first absorptive linear polarizer, a first retardation layer, a reflective circular polarizer, a half mirror, a second retardation layer, and a second absorptive linear polarizer in this order,
 in which the reflective circular polarizer has an action of a concave mirror with respect to a beam incident from the half mirror side.

[2] The virtual reality display device according to [1],
 in which both of the first retardation layer and the second retardation layer are λ/4 retardation layers.

[3] The virtual reality display device according to [1] or [2],
 in which at least the image display panel, the first absorptive linear polarizer, and the first retardation layer adhere to each other.

[4] The virtual reality display device according to [1] or [2], further comprising:
 at least a third retardation layer that is provided between the image display panel and the first absorptive linear polarizer.

[5] The virtual reality display device according to [4],
 in which the third retardation layer is a λ/4 retardation layer.

[6] The virtual reality display device according to [4] or [5],
 in which at least the image display panel, the third retardation layer, the first absorptive linear polarizer, and the first retardation layer adhere to each other.

[7] The virtual reality display device according to [4] or [5],
 in which at least the third retardation layer, the first absorptive linear polarizer, the first retardation layer, and the reflective circular polarizer adhere to each other.

[8] The virtual reality display device according to any one of [1] to [7],
 wherein a focal length of the action of the concave mirror by the reflective circular polarizer is 50 mm or less.

[9] The virtual reality display device according to any one of [1] to [8],
 in which the reflective circular polarizer includes a cholesteric liquid crystal layer forming a curved surface.

[10] The virtual reality display device according to any one of [1] to [8],
 in which the reflective circular polarizer is a liquid crystal diffraction element that includes a cholesteric liquid crystal layer having, in a radial shape, a liquid crystal alignment pattern in which an orientation of an optical axis derived from a liquid crystal compound continuously rotates in one in-plane direction in any of surfaces.

According to the present invention, it is possible to provide a thin virtual reality display device including a pancake lens where leaked light can be reduced.

DESCRIPTION OF THE PREFERRED EMBODIMENTS

Figure 1:
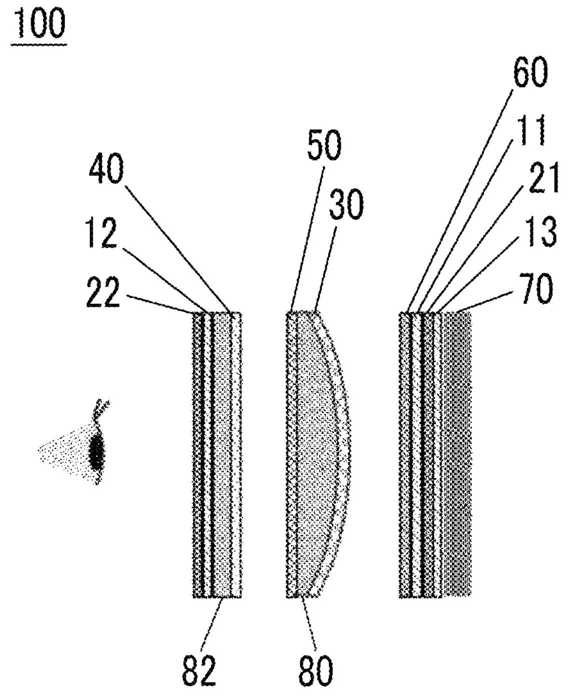
FIG. 1 is an example showing a virtual reality display device according to the present invention.

Hereinafter, the present invention will be described in detail. The description of configuration requirements below may be made based on typical embodiments or specific examples, but the present invention is not limited to such embodiments. In the present specification, numerical ranges represented by "to" include numerical values before and after "to" as lower limit values and upper limit values.

In the present specification, the term "orthogonal" does not denote that the angle formed by two axes or the like is exactly 90°, but denotes 90°±10° and preferably 90°±5°. In addition, the term "parallel" does not denote that the angle formed by two axes or the like is exactly 0°, but denotes 0°±10° and preferably 0°±5°. Further, the angle "45°" does not denote that the angle formed by two axes or the like is exactly 45°, but denotes 45°=10° and preferably 45°±5°.

Here, in the expression related to polarized light, "state of polarized light components orthogonal to each other" denotes a state of polarized light components positioned at antipodal points on the Poincare sphere and correspond to, for example, linearly polarized light components orthogonal to each other or clockwise circularly polarized light (right circularly polarized light) and counterclockwise circularly polarized light (left circularly polarized light).

In the present specification, "absorption axis" denotes a polarization direction in which an absorbance is the maximum in a plane in a case where linearly polarized light is incident. In addition, "reflection axis" denotes a polarization direction in which reflectivity is maximized in a plane in a case where linearly polarized light is incident. In addition, "transmission axis" denotes a direction orthogonal to the absorption axis or the reflection axis in a plane. Furthermore, a term "slow axis" denotes a direction in which a refractive index is the maximum in a plane.

In the present specification, a retardation denotes an in-plane retardation unless otherwise specified, and is referred to as Re(λ). Here, Re(λ) represents an in-plane retardation at a wavelength λ, and the wavelength λ is 550 nm unless otherwise specified.

In addition, a retardation at the wavelength λ in a thickness direction is referred to as Rth(λ) in the present specification.

As Re(λ) and Rth(λ), values measured by AxoScan OPMF-1 (manufactured by Opto Science, Inc.) at the wavelength λ can be used. By inputting an average refractive index ((nx+ny+nz)/3) and a film thickness (d(μm)) to AxoScan, the following expressions are calculated.

Slow Axis Direction (°)

$$Re(\lambda) = R0(\lambda)$$

$$Rth(\lambda) = ((nx + ny)/2 - nz) \times d.$$

<Virtual Reality Display Device>

A virtual reality display device according to an embodiment of the present invention comprises at least an image display panel, a first absorptive linear polarizer, a first retardation layer, a reflective circular polarizer, a half mirror, a second retardation layer, and a second absorptive linear polarizer in this order, in which the reflective circular polarizer has an action of a concave mirror with respect to a beam incident from the half mirror side. In addition, it is preferable that the virtual reality display device further comprises at least a third retardation layer that is provided between the image display panel and the first absorptive linear polarizer.

FIG. 1 is a diagram conceptually showing an example of the virtual reality display device according to the embodiment of the present invention.

A virtual reality display device 100 shown in FIG. 1 includes an image display panel 70, a λ/4 retardation layer 13, an absorptive linear polarizer 21, a λ/4 retardation layer 11, a positive C-plate 60, a reflective circular polarizer 30, an antireflection layer 50, a half mirror 40, a λ/4 retardation layer 12, and an absorptive linear polarizer 22 in this order.

In the example shown in FIG. 1, the λ/4 retardation layer 13, the absorptive linear polarizer 21, the λ/4 retardation layer 11, and the positive C-plate 60 are laminated on a display surface side of the image display panel 70, and preferably adhere to each other. The λ/4 retardation layer 13 is the third retardation layer according to the embodiment of the present invention, the absorptive linear polarizer 21 is the first absorptive linear polarizer according to the embodiment of the present invention, and the λ/4 retardation layer 11 is the first retardation layer according to the embodiment of the present invention.

The reflective circular polarizer 30 is disposed to face the positive C-plate 60. In addition, in the example shown in FIG. 1, a surface side of the reflective circular polarizer 30 opposite to the image display panel 70 side is laminated on a support 80 having a convex surface, and the reflective circular polarizer 30 is formed in a convex shape toward the image display panel 70. Therefore, the reflective circular polarizer 30 is formed in a concave shape toward the half mirror 40. That is, the reflective circular polarizer 30 has an action of a concave mirror with respect to a configuration where light is incident from the half mirror 40 side.

The support 80 is a support where a surface on the image display panel 70 side is a convex surface and another surface is a plane having light transmittance. That is, as the support 80, for example, a plano-convex lens or a meniscus lens can be used.

The antireflection layer 50 is laminated on a surface of the support 80 opposite to the surface where the reflective circular polarizer 30 is laminated.

The half mirror 40 is disposed to face the antireflection layer 50. In addition, in the example shown in FIG. 1, a surface side of the half mirror 40 opposite to the reflective circular polarizer 30 side is laminated on a support 82.

The support 82 is a support where both surfaces are planes having light transmittance.

On a surface of the support 82 opposite to the surface where the half mirror 40 is laminated, the λ/4 retardation layer 12 and the absorptive linear polarizer 22 are laminated and preferably adhere to each other. The λ/4 retardation layer 12 is the second retardation layer according to the embodiment of the present invention, and the absorptive linear polarizer 22 is the second absorptive linear polarizer according to the embodiment of the present invention.

Figure 2:
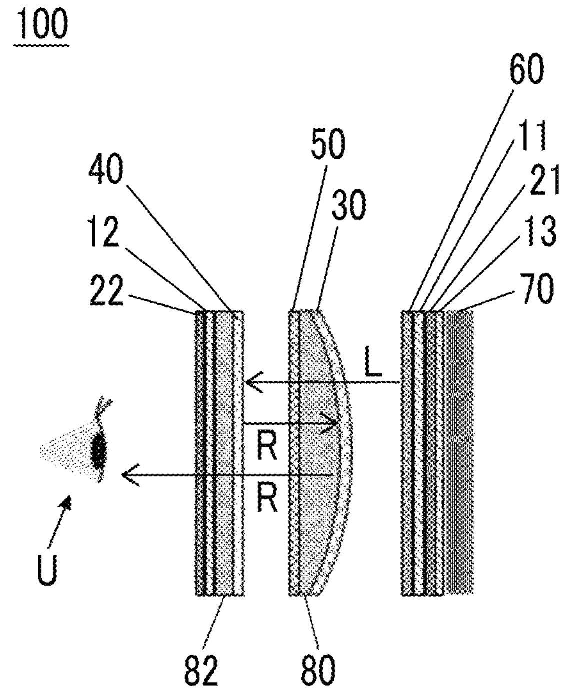
FIG. 2 is a diagram showing an action of the virtual reality display device shown in FIG. 1.

The action of the virtual reality display device 100 will be described using FIG. 2. In FIG. 2, arrows represent light, R represents right circularly polarized light, and L represents left circularly polarized light.

In a case where unpolarized light (video light) is irradiated from the image display panel 70, the unpolarized light transmits through the λ/4 retardation layer 13 as it is, and is converted into one linearly polarized light by the absorptive linear polarizer 21. The linearly polarized light is converted into circularly polarized light by the λ/4 retardation layer 11. That is, a transmission axis of the absorptive linear polarizer 21 and a slow axis of the λ/4 retardation layer 11 are disposed at about 45°.

For example, assuming that the linearly polarized light is converted into left circularly polarized light by the λ/4 retardation layer 11 in the following description, the left circularly polarized light is incident into the reflective circular polarizer 30. In this case, the reflective circular polarizer 30 reflects right circularly polarized light and allows transmission of left circularly polarized light. Therefore, the incident left circularly polarized light transmits through the reflective circular polarizer 30, the support 80, and the antireflection layer 50, and is incident into the half mirror 40.

About half of the left circularly polarized light incident into the half mirror 40 transmits through the half mirror 40, transmits through the support 82, and is incident into the λ/4 retardation layer 12 and the absorptive linear polarizer 22. The λ/4 retardation layer 12 converts the left circularly polarized light into linearly polarized light, and the absorptive linear polarizer 22 absorbs the linearly polarized light in a state where an absorption axis thereof is disposed in an orientation for absorbing the linearly polarized light in the direction that is converted from the left circularly polarized light by the λ/4 retardation layer 12. That is, the λ/4 retardation layer 12 and the absorptive linear polarizer 22 act as a circularly polarizing plate that absorbs left circularly polarized light and allows transmission of right circularly polarized light.

On the other hand, about the remaining half of the left circularly polarized light incident into the half mirror 40 is reflected from the half mirror 40. In this case, the left circularly polarized light is converted into right circularly polarized light. The right circularly polarized light transmits through the antireflection layer 50 and the support 80 and is incident into the reflective circular polarizer 30. Since the reflective circular polarizer 30 reflects right circularly polarized light, the incident right circularly polarized light is reflected toward the half mirror 40. In this case, the reflective circular polarizer 30 has an action of a concave mirror with respect to the beam incident from the half mirror 40, and thus collects the beam.

About half of the right circularly polarized light reflected from the reflective circular polarizer 30 and incident into the half mirror 40 transmits through the half mirror 40, and is incident into the λ/4 retardation layer 12 and the absorptive linear polarizer 22. Since the λ/4 retardation layer 12 and the absorptive linear polarizer 22 allows transmission of right circularly polarized light, the light irradiated to the user U such that the user U can recognize an image. In this case, due to the action of the concave mirror of the reflective circular polarizer 30, the light is collected and emitted to the visible side with respect to that immediately after being irradiated from an image display panel 30. As a result, the light seems to be emitted from a position farther than the image display panel. Therefore, the user U who sees the light recognizes that the light is emitted from the depth side (opposite to the user U side) of the image display panel 30. As a result, the video (image) displayed by the image display panel 30 is recognized by the user U as a virtual image on the depth side of the image display panel 30.

About the remaining half of the right circularly polarized light reflected from the reflective circular polarizer 30 and incident into the half mirror 40 is reflected from the half mirror 40. In this case, the right circularly polarized light is converted into left circularly polarized light. The left circularly polarized light transmits through the antireflection layer 50 and the support 80 and is incident into the reflective circular polarizer 30. Since the reflective circular polarizer 30 transmits through the left circularly polarized light, the incident left circularly polarized light transmits through the reflective circular polarizer 30 and is incident into the positive C-plate 60.

Even in a case where a beam is obliquely incident into the positive C-plate 60, the positive C-plate 60 corrects the beam such that the beam maintains a high circular polarization degree without being elliptically polarized light. The left circularly polarized light transmitted through the positive C-plate 60 is incident into the λ/4 retardation layer 11 and is converted into linearly polarized light. The linearly polarized light transmits through the absorptive linear polarizer 21, is incident into the λ/4 retardation layer 13, and is converted into, for example, left circularly polarized light. This left circularly polarized light is reflected from the surface or the like of the image display panel 30. During the reflection, the left circularly polarized light is converted into right circularly polarized light. Therefore, in a case where the right circularly polarized light reflected from the surface or the like of the image display panel 30 is incident into the λ/4 retardation layer 13, the right circularly polarized light is converted into linearly polarized light, and the linearly polarized light is incident into the absorptive linear polarizer 21. However, since the transmission axis of the absorptive linear polarizer 21 is orthogonal to linearly polarized light, the linearly polarized light is absorbed by the absorptive linear polarizer 21.

As described above, as the virtual reality display device in the related art, the configuration including an image display panel, a reflective polarizer, and a half mirror is known. In this configuration, there is a problem in that a part of the beam emitted from the image display panel is leaked light without reciprocating between the reflective polarizer and the half mirror due to disturbance of polarization, unpreferable reflection, and the like, which leads to occurrence of double images, a decrease in contrast, and the like.

On the other hand, it is disclosed that, with the configuration where the image display panel, the reflective linear polarizer, and the half mirror are provided in this order, disturbance of polarization, unpreferable reflection, and the like are suppressed, leaked light is reduced, and the occurrence of double images and a decrease in contrast are suppressed.

However, in the configuration where the image display panel, the reflective linear polarizer, and the half mirror are provided in this order, the reflective linear polarizer needs to have an action of a concave mirror with respect to a beam incident from the half mirror side. Further, in order to impart the function of the concave mirror to the reflective linear polarizer, the reflective linear polarizer needs to be formed in a curved shape.

According to an investigation by the present inventors, it was found that, in a case where the reflective linear polarizer is formed in a curved shape, an optical axis of the reflective linear polarizer is distorted, appropriate reflection and transmission of incidence light cannot be performed, and the leaked light rather increases.

On the other hand, the virtual reality display device according to the embodiment of the present invention comprises an image display panel, a first absorptive linear polarizer, a first retardation layer, a reflective circular polarizer, a half mirror, a second retardation layer, and a second absorptive linear polarizer in this order, in which the reflective circular polarizer has an action of a concave mirror with respect to a beam incident from the half mirror side. In the virtual reality display device according to the embodiment of the present invention, the reflective circular polarizer is formed in a curved shape to act as a concave mirror. Therefore, there is no problem such as the distortion of the optical axis, and thus appropriate reflection and transmission of incidence light can be performed, and the leaked light can be reduced.

In addition, in the example shown in FIG. 1, in a preferable aspect, the λ/4 retardation layer 13 is provided between the image display panel 70 and the absorptive linear polarizer 21. By providing the λ/4 retardation layer 13, the light reflected from the half mirror 40, transmitted through the reflective circular polarizer 30, and reflected from the surface of the image display panel 70 is absorbed by the absorptive linear polarizer 21, and the occurrence of leaked light can be suppressed.

In addition, in the example shown in FIG. 1, in a preferable aspect, the support 80 that bends and supports the reflective circular polarizer 30 is provided, and the antireflection layer 50 is provided on the surface of the support 80 opposite to the reflective circular polarizer 30. As a result, the occurrence of unnecessary reflection from an air interface of the support 80 is suppressed, and the occurrence of leaked light can be suppressed.

The virtual reality display device according to the embodiment of the present invention may have a configuration where the support 80 is not provided.

In addition, in the example shown in FIG. 1, the configuration where the half mirror 40, the λ/4 retardation layer 12, and the absorptive linear polarizer 22 are supported by the support 82 is adopted. However, the present invention is not limited to the example. For example, the half mirror 40, the λ/4 retardation layer 12, and the absorptive linear polarizer 22 may be directly laminated.

In addition, in the example shown in FIG. 1, in a preferable aspect, the image display panel 70, the λ/4 retardation layer 13, the absorptive linear polarizer 21, the λ/4 retardation layer 11, and the positive C-plate 60 adhere to each other. As a result, an air layer is not present between layers, the occurrence of unnecessary reflection from an air interface is suppressed, and the occurrence of leaked light can be suppressed.

In addition, in the example shown in FIG. 1, the λ/4 retardation layer 11 (positive C-plate 60) and the reflective circular polarizer 30 are spaced from each other. However, the present invention is not limited to this example, the λ/4 retardation layer 11 (positive C-plate 60) and the reflective circular polarizer 30 may be in contact with each other, and the reflective circular polarizer 30 (positive C-plate 60), the λ/4 retardation layer 11, the absorptive linear polarizer 21, and the λ/4 retardation layer 13 may adhere to each other. As a result, an air layer is not present between layers, the occurrence of unnecessary reflection from an air interface is suppressed, and the occurrence of leaked light can be suppressed. In the configuration where the reflective circular polarizer 30 (positive C-plate 60), the λ/4 retardation layer 11, the absorptive linear polarizer 21, and the λ/4 retardation layer 13 adhere to each other, the layers may adhere to each other and then formed in a curved surface as a whole by vacuum forming or the like. Alternatively, the layers may be formed in a curved surface and then adhere to each other.

Figure 3:
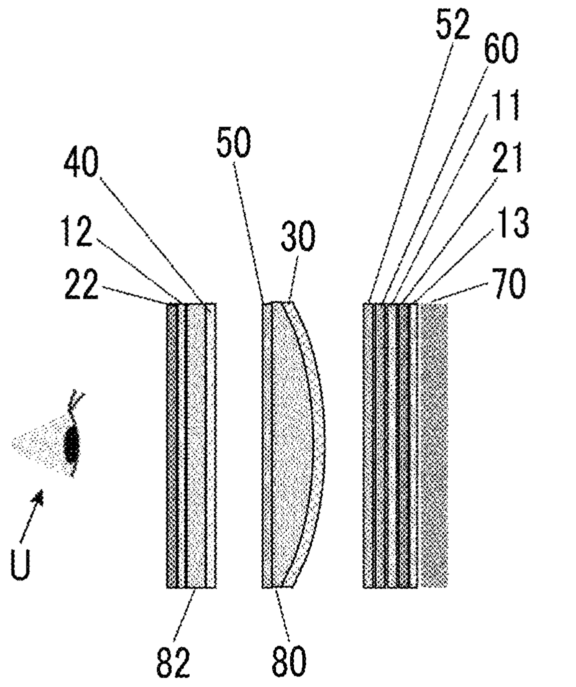
FIG. 3 is a diagram conceptually showing a configuration of a virtual reality display device according to Example 2.

In addition, in the example shown in FIG. 3, in a case where the λ/4 retardation layer 11 (positive C-plate 60) and the reflective circular polarizer 30 are spaced from each other, an antireflection layer 52 may be provided on the surface of the λ/4 retardation layer 11 (positive C-plate 60). As a result, the occurrence of unnecessary reflection from an air interface of the λ/4 retardation layer 11 (positive C-plate 60) is suppressed, and the occurrence of leaked light can be suppressed.

Figure 4:
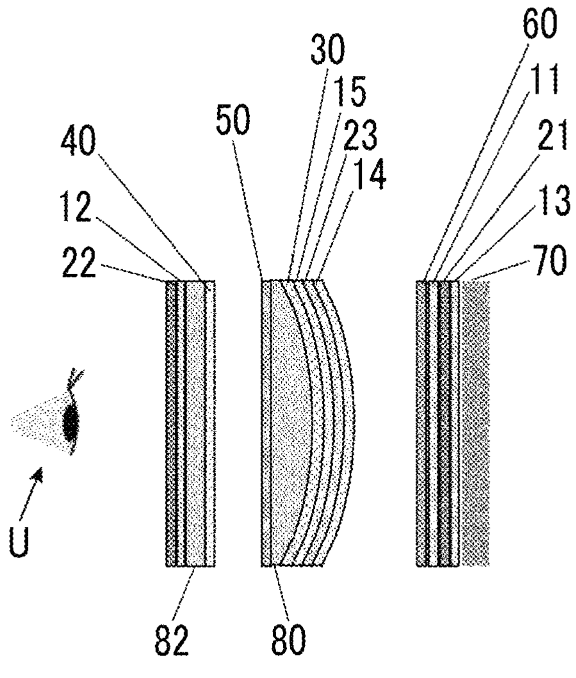
FIG. 4 is a diagram conceptually showing a configuration of a virtual reality display device according to Example 3.

In addition, as in the example shown in FIG. 4, in a case where the λ/4 retardation layer 11 (positive C-plate 60) and the reflective circular polarizer 30 are spaced from each other, a λ/4 retardation layer 14, an absorptive linear polarizer 23, and a λ/4 retardation layer 15 may be provided on the surface of the reflective circular polarizer 30. As a result, the occurrence of unnecessary reflection from an air interface of the reflective circular polarizer 30 is suppressed, and the occurrence of leaked light can be suppressed.

In addition, in the example shown in FIG. 1, the support 80 and the half mirror 40 are spaced from each other. However, the present invention is not limited to this configuration, and the support 80 and the half mirror 40 may be in contact with each other and may adhere to each other. In this case, the antireflection layer 50 is unnecessary. As a result, an air layer is not present between layers, the occurrence of unnecessary reflection from an air interface is suppressed, and the occurrence of leaked light can be suppressed.

In addition, a focal length of the concave mirror in the reflective circular polarizer 30 may be appropriately set depending on the performance required for the virtual reality display device. From the viewpoint of reducing the distance between the concave mirror and the half mirror to reduce the thickness of the virtual reality display device, the focal length of the concave mirror is preferably 50 mm or less, more preferably 30 mm or less, and still more preferably 15 mm or less.

In a case where parallel light is incident into a reflecting surface of the concave mirror, the focal length of the concave mirror refers to a distance between a focal point where a beam reflected from the reflecting surface is collected and a bottom of a concave surface in the concave mirror. In addition, in a case where the concave mirror is formed of a liquid crystal diffraction element described below, the focal length refers to a distance between a focal point where reflected light is collected and a reflecting surface of the liquid crystal diffraction element.

In a case where the reflective circular polarizer 30 is formed on the above-described support having the convex surface, in the concave mirror, reflected light from the reflecting surface is refracted by a lens or is collected to any position. Therefore, the position can be considered as the focal point. All the beams of the reflected light are not necessarily limited to being focused on one point, and a position where most of reflected light is collected can be considered as the focal point. In addition, the focal point may vary depending on wavelengths of light, and thus can be checked at any wavelength of visible light.

In addition, in the example shown in FIG. 1, the half mirror 40 has a flat shape. However, the present invention is not limited to this example, and the half mirror 40 may be formed in a curved surface. In this case, it is preferable that the half mirror 40 acts as a convex mirror with respect to light incident from the reflective circular polarizer 30 side.

<Image Display Panel>

As the image display panel used in the present invention, a well-known image display panel can be used. Examples of the image display panel include a display panel where fine light-emitting emitters are arranged on a transparent substrate, for example, an organic electroluminescent display panel, a light emitting diode (LED) display panel, or a micro LED display panel. Alternatively, for example, a liquid crystal display panel can be used. In the following description, the organic electroluminescence display device will also be referred to as "OLED". OLED is an abbreviation for "Organic Light Emitting Diode".

<Retardation Layer>

In a case where circularly polarized light is incident, the retardation layer used in the present invention has a function of converting emitted light into substantially linearly polarized light. For example, a λ/4 retardation layer in which Re is approximately ¼ wavelength at any wavelengths in the visible range can be used. In this case, an in-plane retardation Re(550) at a wavelength of 550 nm is preferably 120 nm to 150 nm, more preferably 125 nm to 145 nm, and still more preferably 135 nm to 140 nm.

In addition, a retardation layer in which Re is approximately ¾ wavelength or approximately 5/4 wavelength is also preferable from the viewpoint that the linearly polarized light can be converted into the circularly polarized light.

In addition, it is preferable that the retardation layer used in the present invention has reverse dispersibility with respect to the wavelength. It is preferable that the retardation layer has reverse dispersibility from the viewpoint that circularly polarized light can be converted into linearly polarized light over a wide wavelength range in the visible range. Here, "having reverse dispersibility with respect to the wavelength" denotes that, as the wavelength increases, the value of the retardation at the wavelength increases.

The retardation layer having reverse dispersibility can be manufactured, for example, by uniaxially stretching a polymer film such as a modified polycarbonate resin film having reverse dispersibility with reference to JP2017-049574A and the like.

In addition, the retardation layer having reverse dispersibility is not limited as long as the retardation layer substantially has reverse dispersibility, and can be manufactured by laminating a retardation layer having Re of approximately ¼ wavelength and a retardation layer having Re of approximately ½ wavelength such that the slow axes form an angle of approximately 60° as described in, for example, JP06259925B. In this case, it is known that, even in a case where the ¼ wavelength retardation layer and the ½ wavelength retardation layer each have forward dispersibility (as the wavelength increases, the value of the retardation at the wavelength decreases), circularly polarized light can be converted into linearly polarized light over a wide wavelength range in the visible range, and the layers can be regarded as having substantially reverse dispersibility.

In addition, it is also preferable that the retardation layer used in the present invention includes a layer formed by immobilizing uniformly aligned liquid crystal compounds. For example, a layer formed by uniformly aligning rod-like liquid crystal compounds horizontally to the in-plane direction, a layer formed by uniformly aligning disk-like liquid crystal compounds vertically to the in-plane direction, and the like can be used. Furthermore, for example, a retardation layer having reverse dispersibility can be manufactured by uniformly aligning rod-like liquid crystal compounds having reverse dispersibility and immobilizing the compounds with reference to JP2020-084070A and the like.

In addition, it is also preferable that the retardation layer used in the present invention has a layer formed by immobilizing twisted and aligned liquid crystal compounds with a helical axis in the thickness direction. For example, as disclosed in JP05753922B and JP05960743B, it is preferable that a retardation layer having a layer formed by immobilizing twisted and aligned rod-like liquid crystal compounds or twisted and aligned disk-like liquid crystal compounds with a helical axis in the thickness direction is used from the viewpoint that the retardation layer can be regarded as having substantially reverse dispersibility.

The thickness of the retardation layer is not particularly limited, but is preferably in a range of 0.1 to 8 μm and more preferably in a range of 0.3 to 5 μm from the viewpoint of reducing the thickness.

The retardation layer according to the embodiment of the present invention may include a support, an alignment layer, and a retardation layer. The support and the alignment layer may be a temporary support that is peeled off and removed after bonding the retardation layer to another member. It is preferable that a temporary support is used from the viewpoint that the thickness of the laminate can be reduced by transferring the retardation layer to another member and peeling and removing the temporary support and the adverse effect of the retardation of the temporary support on the polarization degrees of transmitted light and reflected light can be eliminated.

The kind of the support is not particularly limited, but it is preferable that the support is transparent, and examples thereof include films made of cellulose acylate, polycarbonate, polysulfone, polyethersulfone, polyacrylate and polymethacrylate, cyclic polyolefin, polyolefin, polyamide, polystyrene, and polyester. Among these, a cellulose acylate film, cyclic polyolefin, polyacrylate, or polymethacrylate is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, and the like are preferable.

In addition, from the viewpoint of suppressing the adverse effect on the polarization degrees of transmitted light and reflected light, it is preferable that the support has a small retardation. Specifically, a magnitude of Re is preferably 10 nm or less, and an absolute value of a magnitude of Rth is preferably 50 nm or less. Further, even in a case where the support is used as the temporary support described above, it is preferable that the temporary support has a small retardation from the viewpoint of performing quality inspection of the retardation layer and other laminates.

<Absorptive Linear Polarizer>

The absorptive linear polarizer used in the present invention is an absorption type polarizer, which absorbs linearly polarized light in an absorption axis direction in incidence light and allows transmission of linearly polarized light in a transmission axis direction. A general polarizer can be used as the absorptive linear polarizer, and preferable examples thereof include a polarizer in which polyvinyl alcohol or another polymer resin is died with a dichroic substance and is stretched such that the dichroic substance is aligned and a polarizer in which a dichroic substance is aligned by using alignment of a liquid crystal compound. Among these, from the viewpoints of the availability and an increase in the polarization degree, a polarizer obtained by dyeing polyvinyl alcohol with iodine and stretching polyvinyl alcohol is preferable.

A thickness of the absorptive linear polarizer is preferably 10 μm or less, more preferably 7 μm or less, and still more preferably 5 μm or less. In a case where the absorptive linear polarizer is thin, during the stretching or forming of a laminated optical film, cracks, breakage, and the like of the film can be prevented.

In addition, a single plate transmittance of the absorptive linear polarizer is preferably 40% or more and more preferably 42% or more. In addition, the polarization degree is preferably 90% or more, more preferably 95% or more, and still more preferably 99% or more. In the present specification, the single plate transmittance and the polarization degree of the absorptive linear polarizer are measured using an automatic polarizing film measuring device: VAP-7070 (manufactured by Jasco Corporation).

In addition, it is preferable that the direction of the transmission axis of the absorptive linear polarizer coincides with the direction of the polarization axis of light converted into linearly polarized light by the retardation layer. For example, in a case where the retardation layer is a λ/4 retardation layer, an angle between the transmission axis of the absorptive linear polarizer and the slow axis of the λ/4 retardation layer is preferably approximately 45°.

It is also preferable that the absorptive linear polarizer used in the present invention is a light absorption anisotropic layer including a liquid crystal compound and a dichroic substance. An absorptive linear polarizer including a liquid crystal compound and a dichroic substance is preferable from the viewpoint that the thickness thereof can be reduced and cracks, breakage, and the like are unlikely to occur even after stretching, forming, and the like. A thickness of the light absorption anisotropic layer is not particularly limited, but is preferably 0.1 to 8 μm and more preferably 0.3 to 5 μm from the viewpoint of reducing the thickness.

The absorptive linear polarizer including a liquid crystal compound and a dichroic substance can be manufactured with reference to, for example, JP2020-023153A. From the viewpoint of improving the polarization degree of the absorptive linear polarizer, an alignment degree of the dichroic substance in the light absorption anisotropic layer is preferably 0.95 or more and more preferably 0.97 or more.

In a case where the absorptive linear polarizer according to the embodiment of the present invention consists of the light absorption anisotropic layer including the liquid crystal compound and the dichroic substance, the absorptive linear polarizer may include a support, an alignment layer, and a light absorption anisotropic layer. The support and the alignment layer may be a temporary support that is peeled off and removed after bonding the absorptive linear polarizer to another member. It is preferable that a temporary support is used from the viewpoint that the thickness of the laminate can be reduced by transferring the light absorption anisotropic layer to another member and peeling and removing the temporary support and the adverse effect of the retardation of the temporary support on the polarization degrees of transmitted light and reflected light can be eliminated.

The kind of the support is not particularly limited, but it is preferable that the support is transparent, and examples thereof include films made of cellulose acylate, polycarbonate, polysulfone, polyethersulfone, polyacrylate and polymethacrylate, cyclic polyolefin, polyolefin, polyamide, polystyrene, and polyester. Among these, a cellulose acylate film, cyclic polyolefin, polyacrylate, or polymethacrylate is preferable. In addition, commercially available cellulose acetate films (for example, "TD80U" or "Z-TAC" manufactured by FUJIFILM Corporation) can also be used.

In a case where the support is a temporary support, a support having high tear strength is preferable from the viewpoint of preventing breakage during peeling. For example, a polycarbonate-based film, a polyester-based film, and the like are preferable.

In addition, from the viewpoint of suppressing the adverse effect on the polarization degrees of transmitted light and reflected light, it is preferable that the support has a small retardation. Specifically, a magnitude of Re is preferably 10 nm or less, and an absolute value of a magnitude of Rth is preferably 50 nm or less. Further, even in a case where the support is used as the temporary support described above, it is preferable that the temporary support has a small retardation from the viewpoint of performing quality inspection of the light absorption anisotropic layer and other laminates.

<Half Mirror>

The half mirror used in the present invention is a well-known half mirror in the related art that allows transmission of about half of incident light and reflects the remaining half of the incident light. The transmittance of the half mirror is preferably 50±30%, more preferably 50±10%, and most preferably 50%. The half mirror has a configuration in which, for example, a reflective layer formed of a metal such as silver or aluminum is provided on a substrate formed of a transparent resin such as polyethylene terephthalate (PET), a cycloolefin polymer (COP), or polymethyl methacrylate (PMMA), glass, or the like. The reflective layer formed of a metal such as silver or aluminum is formed on a surface of the substrate by vapor deposition or the like. The thickness of the reflective layer is preferably 1 to 20 nm, more preferably 2 to 10 nm, and still more preferably 3 to 6 nm. In addition, it is preferable that the substrate does not have a retardation. From this viewpoint, the substrate of the half mirror is preferably a cycloolefin polymer (COP), polymethyl methacrylate (PMMA), or glass.

<Reflective Circular Polarizer>

The reflective circular polarizer is a polarizer that allows transmission of right circularly polarized light or left circularly polarized light and reflects circularly polarized light having a turning direction opposite to that of the transmitted circularly polarized light.

Examples of the reflective circular polarizer include a reflective circular polarizer including a cholesteric liquid crystal layer. The cholesteric liquid crystal layer is a liquid crystal phase obtained by immobilizing a cholesterically aligned liquid crystal phase (cholesteric liquid crystal phase).

As is well known, the cholesteric liquid crystal layer has a helical structure in which the liquid crystal compound is helically turned and laminated. In the helical structure, a configuration in which the liquid crystal compound is helically rotated once (rotated by) 360° and laminated is set as one helical pitch (helical pitch), and plural pitches of the helically turned liquid crystal compounds are laminated.

The cholesteric liquid crystal layer reflects left circularly polarized light or right circularly polarized light in a specific wavelength range and allows transmission of the other light depending on the length of the helical pitch and the helical turning direction (sense) of the liquid crystal compound.

Accordingly, in a case where the virtual reality display device displays a color image, the reflective circular polarizer may include, for example, a plurality of cholesteric liquid crystal layers including a cholesteric liquid crystal layer that has a central wavelength of selective reflection for red light, a cholesteric liquid crystal layer that has a central wavelength of selective reflection for green light, and a cholesteric liquid crystal layer that has a central wavelength of selective reflection for blue light.

In addition, in a case where the reflective circular polarizer includes a cholesteric liquid crystal layer, a support and an alignment film for aligning a liquid crystal compound in the cholesteric liquid crystal layer may be provided.

The thickness of the reflective circular polarizer may be appropriately adjusted depending on the kind of the reflective circular polarizer and the like such that polarized light to be reflected can be sufficiently reflected and polarized light to be transmitted can be sufficiently transmitted.

In the present invention, the reflective circular polarizer needs to have an action of a concave mirror with respect to a beam incident from the half mirror side. In order to give the action of the concave mirror to the reflective circular polarizer, the reflective circular polarizer itself may be formed in a concave shape. The reflective circular polarizer may be a liquid crystal diffraction element that includes a cholesteric liquid crystal layer having, in a radial shape, a liquid crystal alignment pattern in which an orientation of an optical axis derived from a liquid crystal compound continuously rotates in one in-plane direction in any of surfaces. In this case, the reflective circular polarizer can act as a concave mirror while being flat. Accordingly, the thickness of the virtual reality display device can be reduced by using, as the reflective circular polarizer, the liquid crystal diffraction element that includes the cholesteric liquid crystal layer having the liquid crystal alignment pattern in a radial shape. Regarding the cholesteric liquid crystal layer having the liquid crystal alignment pattern in a radial shape, a configuration described in WO2019/131950A or the like can be used.

(Method of Forming Cholesteric Liquid Crystal Layer)

The cholesteric liquid crystal layer can be formed by immobilizing a cholesteric liquid crystal phase in a layer shape.

The structure in which a cholesteric liquid crystal phase is immobilized may be a structure in which the alignment of the liquid crystal compound as a cholesteric liquid crystal phase is immobilized. Typically, the structure in which a cholesteric liquid crystal phase is immobilized is preferably a structure which is obtained by making the polymerizable liquid crystal compound to be in a state where a cholesteric liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystal phase is immobilized is not particularly limited as long as the optical characteristics of the cholesteric liquid crystal phase are maintained, and the liquid crystal compound in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystal phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming the cholesteric liquid crystal phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment control agent contributing to the stable or rapid alignment of a cholesteric liquid crystal phase. Examples of the surfactant include a silicone-based surfactant and a fluorine-based surfactant. Among these, a fluorine-based surfactant is preferable.

Specific examples of the surfactant include compounds described in paragraphs “0082” to “0090” of JP2014-119605A, compounds described in paragraphs “0031” to “0034” of JP2012-203237A, exemplary compounds described in paragraphs “0092” and “0093” of JP2005-099248A, exemplary compounds described in paragraphs “0076” to “0078” and “0082” to “0085” of JP2002-129162A, and fluorine (meth)acrylate polymers described in paragraphs “0018” to “0043” of JP2007-272185A.

The surfactants may be used alone or in combination of two or more kinds.

As the fluorine-based surfactant, a compound described in paragraphs “0082” to “0090” of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystal phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes a chiral carbon atom. However, an axially chiral compound or a planar chiral compound not having a chiral carbon atom can also be used as the chiral agent. Examples of the axially chiral compound or the planar chiral compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photo mask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator to be used is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystal phase, and curing the liquid crystal compound.

That is, in a case where the cholesteric liquid crystal layer is formed on the alignment film, it is preferable that the cholesteric liquid crystal layer obtained by immobilizing a cholesteric liquid crystal phase is formed by applying the liquid crystal composition to the alignment film, aligning the liquid crystal compound to a state of a cholesteric liquid crystal phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition may be aligned to a cholesteric liquid crystal phase. In the case of heating, the heating temperature is preferably 200 °C or lower and more preferably 130 °C or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 $mJ/cm^2$ to 50 $J/cm^2$ and more preferably 50 to 1500 $mJ/cm^2$. In order to promote a photopolymerization reaction, light irradiation may be performed under heating conditions or in a nitrogen atmosphere. The wavelength of irradiated ultraviolet light is preferably 250 to 430 nm.

In addition, as a method of forming the cholesteric liquid crystal layer, a method of forming a tilted liquid crystal layer that is formed of a composition including a disk-like liquid crystal compound and in which a molecular axis of the disk-like liquid crystal compound is tilted with respect to the surface and forming a cholesteric liquid crystal layer on the tilted liquid crystal layer using a composition including a liquid crystal compound is suitably used.

The method of forming the cholesteric liquid crystal layer using the tilted liquid crystal layer is described in paragraphs "0049" to "0194" of WO2019/181247A.

The thickness of the cholesteric liquid crystal layer is not particularly limited, and the thickness with which a required light reflectivity can be obtained may be appropriately set depending on the light reflectivity required for the cholesteric liquid crystal layer, the material for forming the cholesteric liquid crystal layer, and the like.

<Antireflection Layer>

As the antireflection layer, an interference reflection film in which a dielectric film, a high refractive index material, and a low refractive index material are alternately laminated or a well-known anti-reflection film having a moth-eye structure in which a shape is formed on a surface can be appropriately used.

<Positive C-Plate>

The positive C-plate is defined as follows. The positive C-plate satisfies a relationship of (C1) in a case where a refractive index in one in-plane direction of the film is represented by nx, a refractive index in the direction orthogonal to the direction of nx is represented by ny, and a refractive index in the thickness direction is represented by nz. The positive C-plate has Rth of a negative value.

$$nx \approx ny < nz \quad \text{Expression (C1)}$$

"≈" described above represents not only a case where both elements are the same but also a case where both elements are substantially the same. An expression, "being substantially the same", for example, "nx≈ny" also covers a case where (nx−ny)×d (where d represents a thickness of the film) is-10 nm to 10 nm, and preferably-5 nm to 5 nm.

The positive C-plate can be obtained by vertical alignment (homeotropical alignment) of a rod-like polymerizable liquid crystal compound. The details of a method of manufacturing the positive C-plate can be found in, for example, the description in JP2017-187732A, JP2016-53709A, and JP2015-200861A.

EXAMPLES

Hereinafter, the characteristics of the present invention will be described in detail using examples. Materials, used amounts, ratios, treatment details, treatment procedures, and the like shown below can be appropriately changed within a range not departing from the scope of the present invention. In addition, configurations other than the configurations described below can also be adopted within a range not departing from the scope of the present invention.

[Manufacturing of Coating Liquids R-1 to R-2 and D-1 to D-2 for Reflective Layer]

A composition shown below was stirred and dissolved in a container held at 70 °C to prepare each of coating liquids R-1 and R-2 for a reflective layer. Here, R represents a coating liquid including a rod-like liquid crystal.

| Coating liquid R-1 for reflective layer | |
|---|---|
| Methyl ethyl ketone | 120.9 parts by mass |
| Cyclohexanone | 21.3 parts by mass |
| Mixture of rod-like liquid crystal compounds shown below | 100.0 parts by mass |
| Photopolymerization initiator B | 1.00 parts by mass |

-continued

| Coating liquid R-1 for reflective layer | |
|---|---|
| Chiral agent A shown below | 3.00 parts by mass |
| Surfactant F1 shown below | 0.027 parts by mass |
| Surfactant F2 shown below | 0.067 parts by mass |

(Coating Liquid R-2 for Reflective Layer)

A coating liquid was prepared using the same method as that of the coating liquid R-1 for a reflective layer, except that the addition amount of the chiral agent A was changed as shown in the following table.

Table 1. Amount of Chiral Agent of Coating Liquid including Rod-Like Liquid Crystal

TABLE 1

| Coating Liquid Name | Chiral Agent (Part(s) by Mass) |
|---|---|
| Liquid R-1 | 3.00 |
| Liquid R-2 | 3.62 |

Mixture of Rod-Like Liquid Crystals

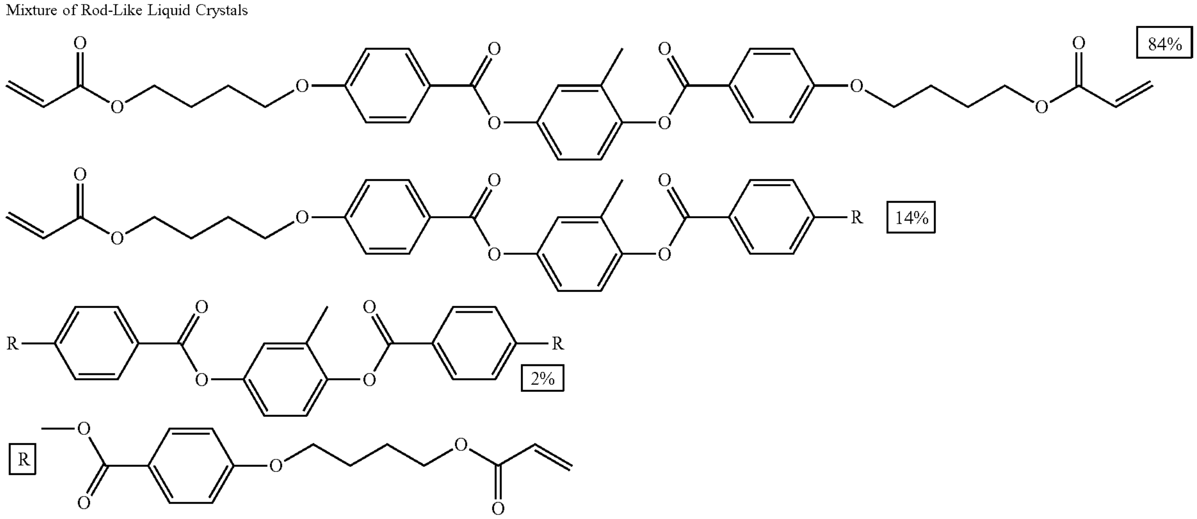

In the above-described mixture, a numerical value is represented by mass %. In addition, R represents a group to be bonded to an oxygen atom. Further, an average molar absorption coefficient of the above-described rod-like liquid crystal at a wavelength of 300 to 400 nm was 140/mol·cm.

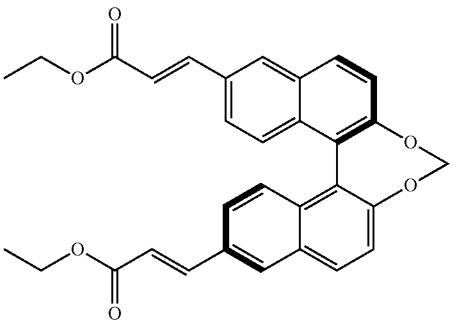

Chiral Agent A

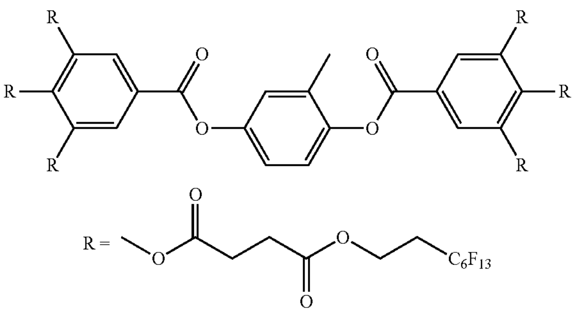

Surfactant F1

-continued

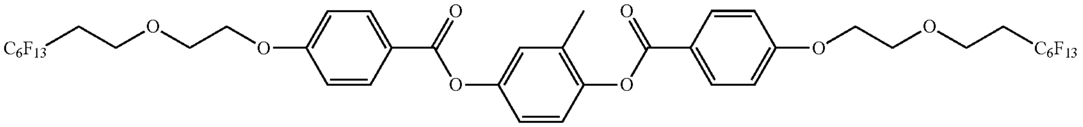

Surfactant F2

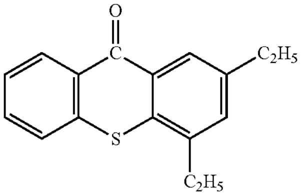

Photopolymerization Initiator B

The chiral agent A is a chiral agent in which the helical twisting power (HTP) is reduced by light.

(Coating Liquid D-1 for Reflective Layer)

A composition shown below was stirred and dissolved in a container held at 50 °C to prepare each of coating liquids D-1 and D-2 for a reflective layer. Here, D represents a coating liquid including a disk-like liquid crystal.

| Coating liquid D-1 for reflective layer | |
|---|---|
| Disk-like liquid crystal (A) shown below | 80 parts by mass |
| Disk-like liquid crystal (B) shown below | 20 parts by mass |
| Polymerizable monomer E1 | 10 parts by mass |
| Surfactant F4 | 0.3 parts by mass |

-continued

| Coating liquid D-1 for reflective layer | |
|---|---|
| Photopolymerization initiator (IRGACURE 907 manufactured by BASF SE) | 3 parts by mass |
| Chiral agent A | 4.00 parts by mass |
| Methyl ethyl ketone | 290 parts by mass |
| Cyclohexanone | 50 parts by mass |

(Coating Liquid D-2 for Reflective Layer)

A coating liquid was prepared using the same method as that of the coating liquid D-1 for a reflective layer, except that the addition amount of the chiral agent A was changed as shown in the following Table 2.

Table 2. Amount of Chiral Agent of Coating Liquid including Disk-Like Liquid Crystal

TABLE 2

| Coating Liquid Name | Chiral Agent (Part(s) by Mass) |
|---|---|
| Liquid D-1 | 4.00 |
| Liquid D-2 | 5.30 |

Disk-Like Liquid Crystal (A)

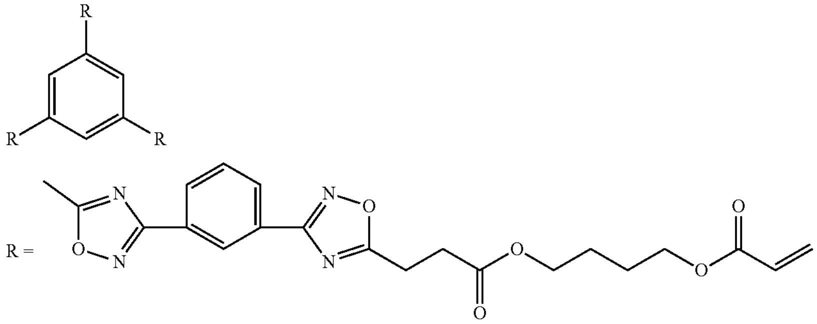

Disk-Like Liquid Crystal (B)

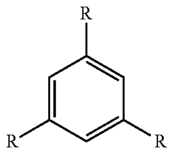

TABLE 2-continued

| Coating Liquid Name | Chiral Agent (Part(s) by Mass) |
| --- | --- |
| R = 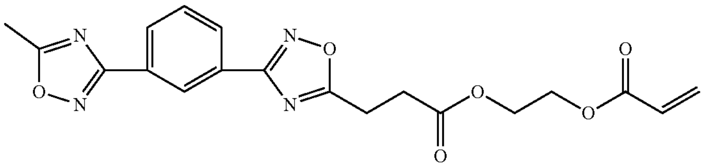 | |
| Polymerizable Monomer E1 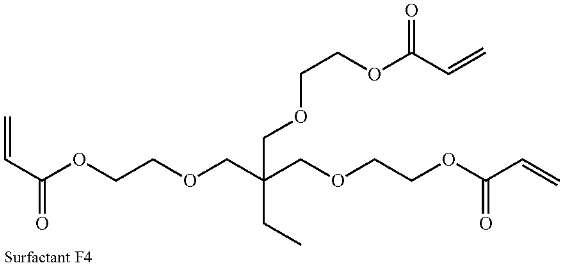 | |
| Surfactant F4 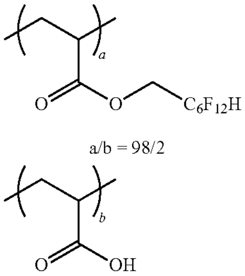 a/b = 98/2 | |

[Manufacturing of Reflective Circular Polarizer 1]

A polyethylene terephthalate (PET) film (A4100 manufactured by Toyobo Co., Ltd.) having a thickness of 50 μm was prepared as a temporary support. This PET film includes an easy adhesion layer on one surface.

A surface of the PET film described above where the easy adhesion layer was not provided was rubbed, the coating liquid R-1 for a reflective layer prepared as described above was applied to the rubbed surface using a wire bar coater, and was dried at 110 °C for 120 seconds. Next, the coating film was irradiated and cured with light using a metal halide lamp at 100°, an illuminance of 80 mW/cm$^2$, and an irradiation dose of 500 mJ/cm$^2$ in a low oxygen atmosphere (100 ppm or less), thereby forming a red light reflecting layer consisting of a cholesteric liquid crystal layer. The irradiation with light was performed from the side of the cholesteric liquid crystal layer in all cases. In this case, the coating thickness was adjusted such that the film thickness of the cured red light reflecting layer was 4.5 μm.

Next, a corona treatment was performed on the surface of the red light reflecting layer at a discharge amount of 150 W·min/m$^2$, and the coating liquid D-1 for a reflective layer was applied to the surface on which the corona treatment was performed using a wire bar coater. Next, the coating film was dried at 70 °C for 2 minutes, and was heat-aged at 115 °C for 3 minutes after vaporizing the solvent, thereby obtaining a uniform alignment state. Next, the coating film was kept at 45 °C and was irradiated with ultraviolet light (300 mJ/cm$^2$) using a metal halide lamp in a nitrogen atmosphere to cure the coating film, thereby forming a yellow light reflecting layer on the red light reflecting layer. The irradiation with light was performed from the side of the cholesteric liquid crystal layer in all cases. Here, the coating thickness was adjusted such that the film thickness of the cured yellow light reflecting layer was 3.3 μm.

Next, the coating liquid R-2 for a reflective layer was applied to the yellow light reflecting layer using a wire bar coater and dried at 110 °C for 120 seconds. Thereafter, the surface was irradiated with light using a metal halide lamp at 100 °C, an illuminance of 80 mW, and an irradiation amount of 500 mJ/cm$^2$ in a low oxygen atmosphere (100 ppm or less) to cure the coating liquid, thereby forming a green light reflecting layer on the yellow light reflecting layer. The irradiation with light was performed from the side of the cholesteric liquid crystal layer in all cases. In this case, the coating thickness was adjusted such that the film thickness of the cured green light reflecting layer was 2.7 μm.

Next, a corona treatment was performed on the surface of the green light reflecting layer at a discharge amount of 150 W·min/m$^2$, and the coating liquid D-2 for a reflective layer was applied to the surface on which the corona treatment was performed using a wire bar coater. Next, the coating film was dried at 70 °C for 2 minutes, and was heat-aged at 115 °C for 3 minutes after vaporizing the solvent, thereby obtaining a uniform alignment state. Next, the coating film was kept at 45 °C and was irradiated with ultraviolet light (300 mJ/cm$^2$) using a metal halide lamp in a nitrogen atmosphere to cure the coating film, thereby forming a blue light reflecting layer on the green light reflecting layer. The irradiation with light was performed from the side of the cholesteric liquid crystal layer in all cases. In this case, the coating thickness was adjusted such that the film thickness of the cured blue light reflecting layer was 2.5 μm.

[Manufacturing of Positive C-Plate 1]

A positive C-plate 1 was manufactured by adjusting the film thickness with reference to the method described in paragraphs 0132 to 0134 of JP2016-053709A. Re of the positive C-plate 1 was 0.2 nm and Rth thereof was-70 nm.

[Manufacturing of Retardation Layer 1]

A retardation layer 1 having reverse dispersibility was manufactured with reference to the method described in paragraphs 0151 to 0163 of JP2020-084070A. Re of the retardation layer 1 was 146 nm and Rth thereof was 73 nm.

<Manufacturing of Absorptive Linear Polarizer>

[Manufacturing of Cellulose Acylate Film 1]

(Manufacturing of Core Layer Cellulose Acylate Dope)

The following composition was put into a mixing tank and was stirred with each other to dissolve the respective components. As a result, a cellulose acetate solution was prepared as a core layer cellulose acylate dope.

| Core layer cellulose acylate dope | |
|---|---|
| Cellulose acetate having an acetyl substitution degree of 2.88 | 100 parts by mass |
| Polyester compound B described in Examples of JP2015-227955A | 12 parts by mass |
| Compound F shown below | 2 parts by mass |
| Methylene chloride (first solvent) | 430 parts by mass |
| Methanol (second solvent) | 64 parts by mass |

Compound F

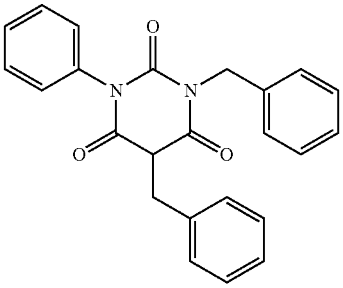 [SMILES: O=C1C(Cc2ccccc2)C(=O)N(c2ccccc2)C(=O)N1Cc1ccccc1]

(Manufacturing of Outer Layer Cellulose Acylate Dope)

10 parts by mass of the following matting agent solution was added to 90 parts by mass of the core layer cellulose acylate dope to prepare a cellulose acetate solution to be used as an outer layer cellulose acylate dope.

| Matting agent solution | |
|---|---|
| Silica particles having an average particle diameter of 20 nm (AEROSIL R972, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope described above | 1 part by mass |

(Manufacturing of Cellulose Acylate Film 1)

The core layer cellulose acylate dope and the outer layer cellulose acylate dope were filtered through filter paper having an average pore size of 34 μm and a sintered metal filter having an average pore size of 10 μm, and three layers that were the core layer cellulose acylate dope and the outer layer cellulose acylate dopes provided on both sides of the core layer cellulose acylate dope were simultaneously cast from a casting port onto a drum at 20 °C (band casting machine).

Next, the film was peeled off in a state where the solvent content reached approximately 20 mass %, both ends of the film in the width direction were fixed with tenter clips, and the film was dried while being stretched at a stretching ratio of 1.1 times in the cross direction.

Thereafter, the film was further dried by being transported between rolls of a heat treatment device to manufacture an optical film having a thickness of 40 μm, and the optical film was used as a cellulose acylate film 1. The in-plane retardation of the obtained cellulose acylate film 1 was 0 nm.

<Formation of Photoalignment Layer PA1>

A coating liquid S-PA-1 for forming an alignment layer described below was continuously applied to the cellulose acylate film 1 using a wire bar. The support on which the coating film was formed was dried with hot air at 140 °C for 120 seconds, and the coating film was irradiated with polarized ultraviolet light (10 $mJ/cm^2$, using an ultra-high pressure mercury lamp) to form a photoalignment layer PA1. The film thickness was 0.3 μm.

| (Coating liquid S-PA-1 for forming alignment layer) | |
|---|---|
| Polymer M-PA-1 shown below | 100.00 parts by mass |
| Acid generator PAG-1 shown below | 5.00 parts by mass |
| Acid generator CPI-110TF shown below | 0.005 parts by mass |
| Xylene | 1220.00 parts by mass |
| Methyl isobutyl ketone | 122.00 parts by mass |

Polymer M-PA-1

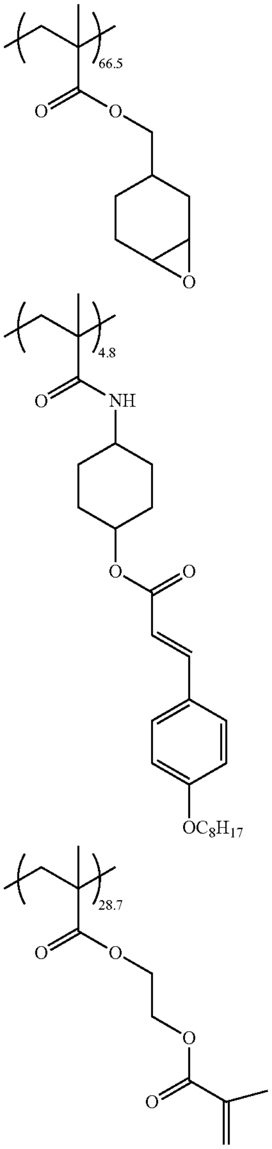

-continued (Coating liquid S-PA-1 for forming alignment layer)

Acid Generator PAG-1

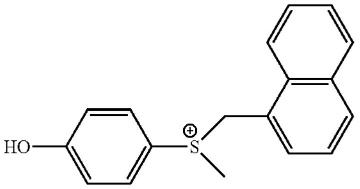 [SMILES: C[S+](Cc1cccc2ccccc12)c1ccc(O)cc1]

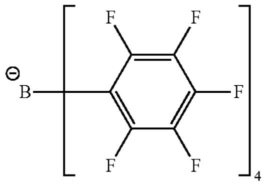

Acid Generator CPI-110F

-continued (Coating liquid S-PA-1 for forming alignment layer)

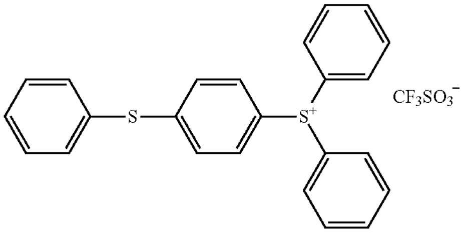

<Formation of Light Absorption Anisotropic Layer P1>

The following coating liquid S-P-1 for forming a light absorption anisotropic layer was continuously applied to the obtained alignment layer PA1 using a wire bar. Next, the coating layer P1 was heated at 140 °C for 30 seconds and was cooled to room temperature (23 °C). Next, the coating layer P1 was heated at 90 °C for 60 seconds and was cooled to room temperature again. Next, the coating layer P1 was irradiated with light using a LED light (central wavelength: 365 nm) for 2 seconds under irradiation conditions of an illuminance of 200 mW/cm$^2$ to form the light absorption anisotropic layer P1 on the alignment layer PA1. The film thickness was 1.6 μm.

| Composition of coating liquid S-P-1 for forming light absorption anisotropic layer | |
|---|---|
| Dichroic substance D-1 shown below | 0.25 parts by mass |
| Dichroic substance D-2 shown below | 0.36 parts by mass |
| Dichroic substance D-3 shown below | 0.59 parts by mass |
| Polymer liquid crystal compound M-P-1 shown below | 2.21 parts by mass |
| Low-molecular-weight liquid crystal compound M-1 | 1.36 parts by mass |
| Polymerization initiator IRGACURE OXE-02 (manufactured by BASF SE) | 0.200 parts by mass |
| Surfactant F3 shown below | 0.026 parts by mass |
| Cyclopentanone | 46.00 parts by mass |
| Tetrahydrofuran | 46.00 parts by mass |
| Benzyl alcohol | 3.00 parts by mass |

Dichroic Substance D-1

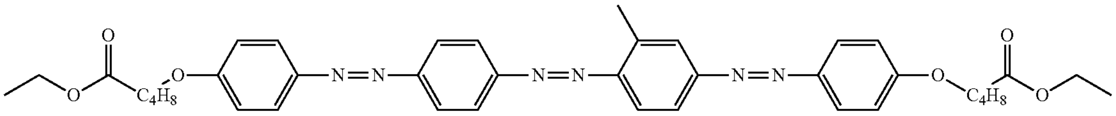

Dichroic Substance D-2

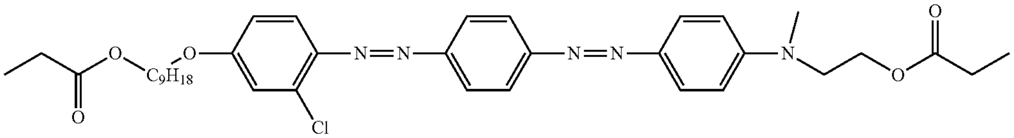

Dichroic Substance D-3

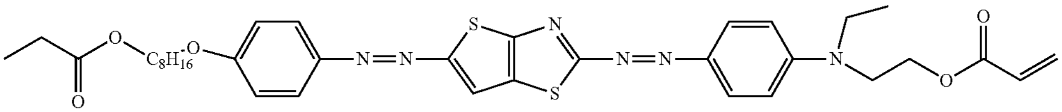

Polymer Liquid Crystalline Compound M-P-1

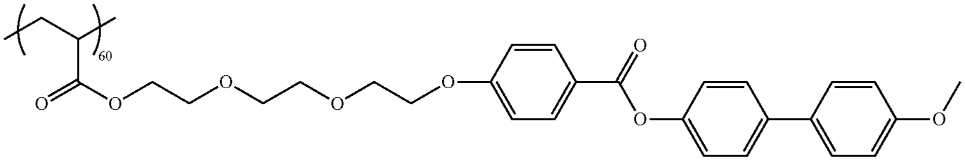

-continued

Composition of coating liquid S-P-1 for forming light absorption anisotropic layer

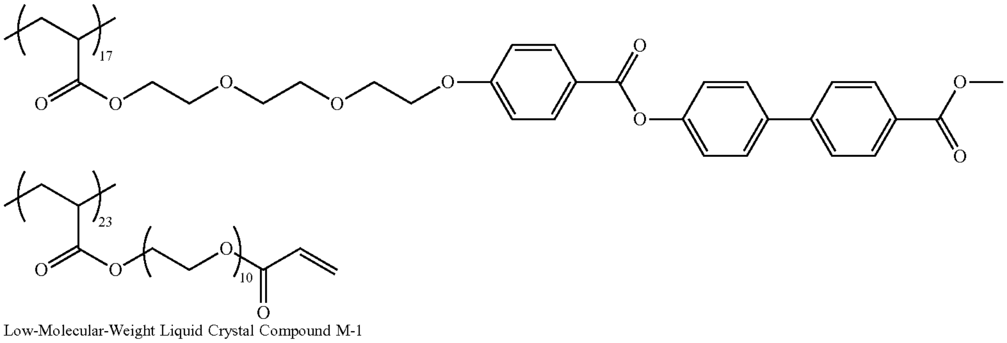

Low-Molecular-Weight Liquid Crystal Compound M-1

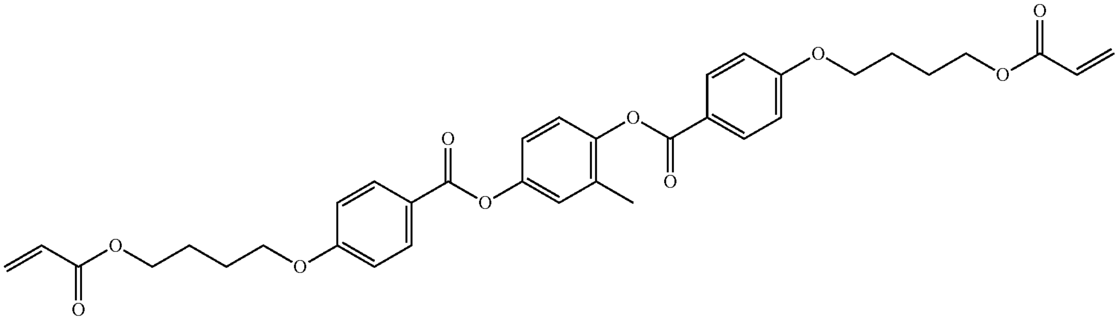 [SMILES: C=CC(=O)OCCCCOc1ccc(C(=O)Oc2ccc(OC(=O)c3ccc(OCCCCOC(=O)C=C)cc3)c(C)c2)cc1]

Surfactant F3

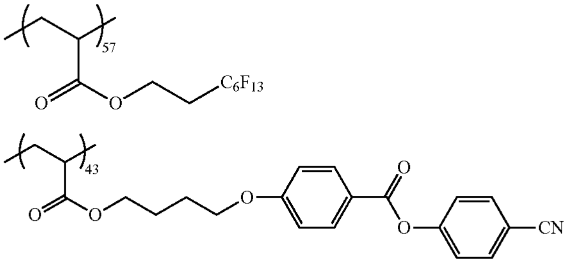

Example 1

A virtual reality display device "Oculus Quest" manufactured by Facebook was decomposed to take out an image display panel. This image display panel was an organic EL display panel, and the λ/4 retardation layer and the absorptive linear polarizer bonded to the surface were peeled off.

Next, the manufactured retardation layer 1, the absorptive linear polarizer, the retardation layer 1, and the positive C-plate 1 were bonded to the surface of the image display panel in this order using a pressure-sensitive adhesive sheet "NCF-D692 (5)" (manufactured by LINTEC Corporation). During the bonding of the retardation layer 1, the absorptive linear polarizer, and the positive C-plate 1, each of the temporary supports was peeled off and removed. The image display panel 1 obtained as described above emitted right circularly polarized light.

Next, a glass plano-convex lens having a diameter of 50 mm and a curvature radius of a 50 mm in a curved portion was prepared, and the manufactured reflective circular polarizer 1 was formed on the curved portion of the plano-convex lens. The forming of the reflective circular polarizer 1 on the curved surface was performed by bonding a pressure-sensitive adhesive sheet "NCF-D692 (5)" (manufactured by LINTEC Corporation) to a bonding surface of the reflective circular polarizer 1 and performing vacuum forming using a method described in JP2012-116094A in a state where a separator film of the pressure-sensitive adhesive sheet was peeled off. The forming temperature was set to 110 °C. This way, a plano-convex lens 1 was manufactured. A focal length of the reflective circular polarizer 1 as a concave mirror was 19 mm at a wavelength of 588 nm.

Next, a half mirror formed of PMMA was prepared, and the retardation layer 1 and the absorptive linear polarizer were bonded to a surface of the half mirror opposite to a reflecting surface using a pressure-sensitive adhesive sheet "NCF-D692 (5)" (manufactured by LINTEC Corporation). This way, a half mirror 1 was manufactured.

The plano-convex lens 1 and the half mirror 1 were laminated on the manufactured image display panel 1 to manufacture a virtual reality display device according to Example 1. In the manufactured virtual reality display device, the distance from the image display panel 1 to the half mirror 1 was about 10 mm.

Example 2

A virtual reality display device according to Example 2 was manufactured using the same method as that of Example 1, except that antireflection films "AR100" (manufactured by Dexerials Corporation) were bonded to the surface of the positive C-plate 1 and a plane portion of the plano-convex lens 1 using a pressure-sensitive adhesive sheet "NCF-D692 (5)" (manufactured by LINTEC Corporation) to obtain an image display panel 2 and a plano-convex lens 2, respectively.

Example 3

The reflective circular polarizer, the retardation layer 1, the absorptive polarizer, and the retardation layer 1 were formed in this order on the curved portion of the same plano-convex lens as that used in Example 1, and an antireflection film "AR100" (manufactured by Dexerials Corporation) was bonded to the plane portion to manufacture a plano-convex lens 3. For the forming of the reflective circular polarizer, the retardation layer 1, and the absorptive polarizer, the same vacuum forming method as that of Example 1 was used.

A virtual reality display device according to Example 3 was manufactured using the same method as that of Example 1, except that the plano-convex lens 1 was changed to the plano-convex lens 3.

Comparative Example 1

The reflective circular polarizer, the retardation layer 1, a reflective linear polarizer "APF" (manufactured by 3M), and the retardation layer 1 were formed in this order on the curved portion of the same plano-convex lens as that used in Example 1. For the forming of the retardation layer 1 and the APF, the same vacuum forming method as that of the forming of the reflective circular polarizer was used. During the forming of the APF, the forming temperature needed to be increased to 150 °C. In addition, an antireflection film "AR100" (manufactured by Dexerials Corporation) was bonded to a plane portion of the plano-convex lens using a pressure-sensitive adhesive sheet "NCF-D692 (5)" (manufactured by LINTEC Corporation). This way, a plano-convex lens 4 reflecting circularly polarized light was manufactured.

Figure 5:
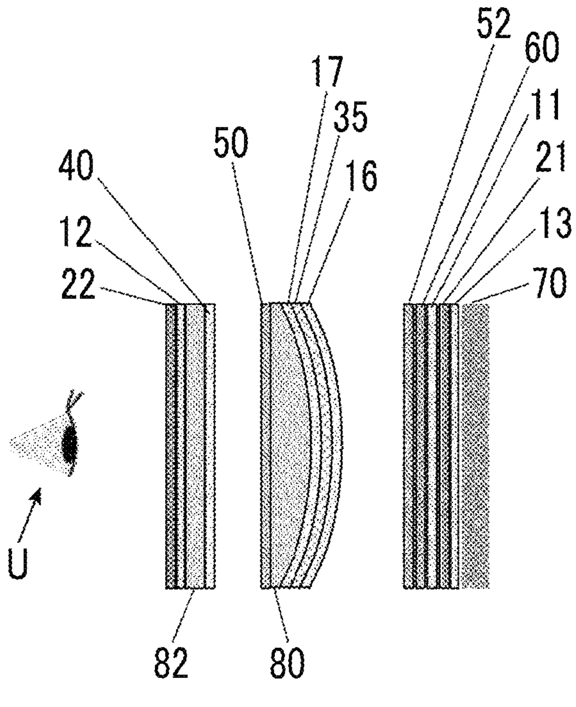
FIG. 5 is a diagram conceptually showing a configuration of a virtual reality display device according to Comparative Example 1.

A virtual reality display device according to Comparative Example 1 was manufactured using the same method as that of Example 2, except that the plano-convex lens 2 was changed to the plano-convex lens 4 (refer to FIG. 5).

Example 4

A plano-convex lens 5 was manufactured using the same method as that of Example 1, except that the curvature radius of the plano-convex lens was changed to 80 mm. A virtual reality display device according to Example 4 was manufactured using the same method as that of Example 1, except that the plano-convex lens 1 was changed to the plano-convex lens 5. A focal length of the reflective circular polarizer 1 as a concave mirror was 39 mm at a wavelength of 588 nm. In addition, in the manufactured virtual reality display device, the distance from the image display panel 1 to the half mirror 1 was about 18 mm.

Comparative Example 2

A plano-convex lens 6 was manufactured using the same method as that of Comparative Example 1, except that the curvature radius of the plano-convex lens was changed to 80 mm. A virtual reality display device according to Comparative Example 4 was manufactured using the same method as that of Comparative Example 1, except that the plano-convex lens 4 was changed to the plano-convex lens 6. A focal length of the reflective circular polarizer 1 as a concave mirror was 39 mm at a wavelength of 588 nm. In addition, in the manufactured virtual reality display device, the distance from the image display panel 2 to the half mirror 1 was about 18 mm.

<Evaluation of Leaked Light>

In the manufactured virtual reality display device, a black-and-white checkered pattern was displayed on the image display panel, and the degree of leaked light was evaluated by visual inspection based on the following four grades. In a case where leaked light is present, double images are recognized, and the contrast in the corresponding portion decreases.

A: no double images were visible at all

B: the double images were slightly visible, but not noticeable

C: the double images were clearly visible

D: the double images were strongly visible

The results are shown in Table 3.

Table 3. Evaluation Results of Leaked Light in Virtual Reality Display Devices according to Examples and Comparative Examples

TABLE 3

| | Image Display Panel | Concave Mirror | Half Mirror | Distance from Panel to Half Mirror | Leaked Light |
|---|---|---|---|---|---|
| Example 1 | Image Display Panel 1 | Plano-Convex Lens 1 | Half Mirror 1 | 10 mm | B |
| Example 2 | Image Display Panel 2 | Plano-Convex Lens 2 | Half Mirror 1 | 10 mm | A |
| Example 3 | Image Display Panel 1 | Plano-Convex Lens 3 | Half Mirror 1 | 10 mm | A |
| Comparative Example 1 | Image Display Panel 2 | Plano-Convex Lens 4 | Half Mirror 1 | 10 mm | D |
| Example 4 | Image Display Panel 1 | Plano-Convex Lens 5 | Half Mirror 1 | 18 mm | A |
| Comparative Example 2 | Image Display Panel 2 | Plano-Convex Lens 6 | Half Mirror 1 | 18 mm | C |

As can be seen from Table 3, in the virtual reality display device according to the embodiment of the present invention, leaked light was effectively reduced, and the occurrence of double images or a decrease in contrast was suppressed as compared to Comparative Examples.

In addition, in Comparative Examples, as the distance from the image display panel to the half mirror decreased, leaked light further increased. The reason for this is as follows. In order to ensure the same optical path in a case where the distance from the image display panel to the half mirror was decreased, the focal length of the reflective linear polarizer as a concave mirror needed to be reduced. In this case, in a case where the reflective linear polarizer was formed in a curved shape, the distortion of the optical axis was more significant, and appropriate reflection and transmission of incident light was not able to be performed, and leaked light increased.

On the other hand, in can be seen that, in the present invention, even in a case where the distance from the image display panel to the half mirror is decreased such that the focal length of the reflective circular polarizer as a concave mirror decreases, appropriate reflection and transmission of incident light can be performed, and leaked light can be suppressed.

Hereinabove, the virtual reality display device according to the embodiment of the present invention has been described in detail. However, the present invention is not limited to the above-described examples, and various improvements and modifications can be made within a range not departing from the scope of the present invention.

EXPLANATION OF REFERENCES

100: virtual reality display device
11, 12, 13, 14, 15, 16, 17: λ/4 retardation layer
21, 22, 23: absorptive linear polarizer
30: reflective circular polarizer
35: reflective linear polarizer
40: half mirror
50, 52: antireflection layer
60: positive C-plate
70: image display panel
80, 82: support

What is claimed is:

1. A virtual reality display device comprising at least an image display panel, a first absorptive linear polarizer, a first retardation layer, a reflective circular polarizer, a half mirror, a second retardation layer, and a second absorptive linear polarizer in this order, wherein the reflective circular polarizer has an action of a concave mirror with respect to a beam incident from the half mirror side, the virtual reality display device further comprises at least a third retardation layer that is provided between the image display panel and the first absorptive linear polarizer, and at least the image display panel, the third retardation layer, the first absorptive linear polarizer, and the first retardation layer adhere to each other.

2. The virtual reality display device according to claim 1, wherein both of the first retardation layer and the second retardation layer are λ/4 retardation layers.

3. The virtual reality display device according to claim 1, wherein the third retardation layer is a λ/4 retardation layer.

4. The virtual reality display device according to claim 1, wherein at least the image display panel, the third retardation layer, the first absorptive linear polarizer, and the first retardation layer adhere to each other.

5. The virtual reality display device according to claim 1, wherein a focal length of the action of the concave mirror by the reflective circular polarizer is 50 mm or less.

6. The virtual reality display device according to claim 1, wherein the reflective circular polarizer includes a cholesteric liquid crystal layer forming a curved surface.

7. The virtual reality display device according to claim 1, wherein the reflective circular polarizer is a liquid crystal diffraction element that includes a cholesteric liquid crystal layer having, in a radial shape, a liquid crystal alignment pattern in which an orientation of an optical axis derived from a liquid crystal compound continuously rotates in one in-plane direction in any of surfaces.

8. The virtual reality display device according to claim 2, wherein a focal length of the action of the concave mirror by the reflective circular polarizer is 50 mm or less.

9. The virtual reality display device according to claim 2, wherein the reflective circular polarizer includes a cholesteric liquid crystal layer forming a curved surface.

10. The virtual reality display device according to claim 2, wherein the reflective circular polarizer is a liquid crystal diffraction element that includes a cholesteric liquid crystal layer having, in a radial shape, a liquid crystal alignment pattern in which an orientation of an optical axis derived from a liquid crystal compound continuously rotates in one in-plane direction in any of surfaces.

11. The virtual reality display device according to claim 3, wherein at least the image display panel, the third retardation layer, the first absorptive linear polarizer, and the first retardation layer adhere to each other.

12. The virtual reality display device according to claim 1, wherein a focal length of the action of the concave mirror by the reflective circular polarizer is 50 mm or less.

13. The virtual reality display device according to claim 1, wherein the reflective circular polarizer includes a cholesteric liquid crystal layer forming a curved surface.

14. The virtual reality display device according to claim 1, wherein the reflective circular polarizer is a liquid crystal diffraction element that includes a cholesteric liquid crystal layer having, in a radial shape, a liquid crystal alignment pattern in which an orientation of an optical axis derived from a liquid crystal compound continuously rotates in one in-plane direction in any of surfaces.

15. A virtual reality display device comprising at least an image display panel, a first absorptive linear polarizer, a first retardation layer, a reflective circular polarizer, a half mirror, a second retardation layer, and a second absorptive linear polarizer in this order, wherein the reflective circular polarizer has an action of a concave mirror with respect to a beam incident from the half mirror side, and a reflective circular polarizer is not provided on a side of the half mirror opposite to an image display panel side.

* * * * *